United States Patent
Batts et al.

(10) Patent No.: US 10,909,851 B2
(45) Date of Patent: Feb. 2, 2021

(54) VEHICLE INTENT COMMUNICATION SYSTEM

(71) Applicant: Motional AD LLC, Boston, MA (US)

(72) Inventors: Zachary T. Batts, Pittsburgh, PA (US); Ludong Sun, Pittsburgh, PA (US)

(73) Assignee: Motional AD LLC, Boston, MA (US)

(*) Notice: Subject to any disclaimer, the term of this patent is extended or adjusted under 35 U.S.C. 154(b) by 0 days.

(21) Appl. No.: 16/001,042

(22) Filed: Jun. 6, 2018

(65) Prior Publication Data

US 2019/0378411 A1  Dec. 12, 2019

(51) Int. Cl.
*G08G 1/16* (2006.01)
*G08G 1/09* (2006.01)
*B60W 30/095* (2012.01)

(52) U.S. Cl.
CPC ......... *G08G 1/163* (2013.01); *B60W 30/0956* (2013.01); *G08G 1/091* (2013.01); *G08G 1/166* (2013.01); *B60W 2420/42* (2013.01); *B60W 2420/52* (2013.01); *B60W 2554/801* (2020.02); *B60W 2556/65* (2020.02)

(58) Field of Classification Search
CPC ........ G08G 1/163; G08G 1/091; G08G 1/166; B60W 30/0956; B60W 2550/408; B60W 2550/308; B60W 2420/52; B60W 2420/42
See application file for complete search history.

(56) References Cited

U.S. PATENT DOCUMENTS

| | | | |
|---|---|---|---|
| 5,173,859 A * | 12/1992 | Deering ............ | B60K 31/0008 180/271 |
| 7,042,345 B2 * | 5/2006 | Ellis ..................... | A61H 3/061 340/436 |
| 7,889,065 B2 * | 2/2011 | Smith ..................... | B60Q 1/34 200/61.27 |
| 9,969,326 B2 * | 5/2018 | Ross ........................ | B60Q 1/50 |
| 10,089,872 B1 * | 10/2018 | Beaurepaire ......... | G08G 1/146 |
| 10,324,189 B2 * | 6/2019 | Luo ........................ | G01S 17/87 |
| 2010/0198513 A1 * | 8/2010 | Zeng .................... | B60W 40/02 701/300 |

(Continued)

FOREIGN PATENT DOCUMENTS

DE   102016205142   10/2017
EP   32734213   1/2018

OTHER PUBLICATIONS

Danish Search Opinion in Danish Application No. PA201870717, dated Jan. 31, 2019, 9 pages.

(Continued)

*Primary Examiner* — Adnan Aziz
(74) *Attorney, Agent, or Firm* — Fish & Richardson P.C.

(57) ABSTRACT

An intent communication system includes one or more sensors, a controller-circuit, and a broadcast device. The sensors may include one or more of a Light Detection and Ranging (LiDAR), a radar, and a computer vision system. The controller-circuit is disposed in a host vehicle. The controller-circuit is configured to determine, based one or more signals from the one or more sensors, an impending vehicle maneuver. The broadcast device is located in the host vehicle, and is configured to broadcast a broadcast signal containing information directed to the impending vehicle maneuver to at least one vehicle determined to be in a vicinity of the impending vehicle maneuver.

20 Claims, 4 Drawing Sheets

(56) References Cited

U.S. PATENT DOCUMENTS

| | | | |
|---|---|---|---|
| 2010/0253539 | A1 | 10/2010 | Seder et al. |
| 2015/0161894 | A1* | 6/2015 | Duncan ............... G08G 1/163 701/1 |
| 2017/0213462 | A1* | 7/2017 | Prokhorov .......... G08G 1/0965 |
| 2017/0232970 | A1 | 8/2017 | Schaper et al. |
| 2018/0053413 | A1* | 2/2018 | Patil ..................... G01S 11/14 |
| 2018/0061236 | A1* | 3/2018 | Yamamoto ............ B60R 21/00 |
| 2018/0079419 | A1 | 3/2018 | Yamamoto |
| 2018/0082588 | A1* | 3/2018 | Hoffman, Jr. ......... G08G 1/166 |
| 2018/0096602 | A1* | 4/2018 | She ....................... B60W 10/20 |
| 2018/0136643 | A1 | 5/2018 | Tao et al. |
| 2018/0148061 | A1* | 5/2018 | Reckziegel ........ G06K 9/00805 |
| 2018/0308360 | A1* | 10/2018 | Regmi .................. G08G 1/162 |
| 2018/0339703 | A1* | 11/2018 | Nix ....................... B60W 30/06 |
| 2019/0082314 | A1* | 3/2019 | Yukizaki ................. G08G 1/09 |
| 2019/0098471 | A1* | 3/2019 | Rech ..................... G08G 1/162 |
| 2019/0100198 | A1* | 4/2019 | Hakki ............... G02B 27/0103 |
| 2019/0287403 | A1* | 9/2019 | Aoude .................. G06N 20/00 |
| 2019/0291734 | A1* | 9/2019 | Mizuno ................... B60L 7/10 |

OTHER PUBLICATIONS

DK Office Action in Danish Application No. PA 201870717, dated Sep. 18, 2019, 4 pages.
Extended European Search Report in European Appln No. 19178693.8, dated Oct. 31, 2019, 9 pages.
DK 3rd Technical Examination in Danish Appln. No. PA201870717, dated Feb. 11, 2020, 3 pages.
DK 4th Technical Examination in Danish Appln. No. PA201870717, dated Oct. 1, 2020, 6 pages.

* cited by examiner

VEHICLE INTENT COMMUNICATION SYSTEM

TECHNICAL FIELD

The present disclosure relates to autonomous vehicles, and more particularly, to an intent communication system for an autonomous vehicle.

SUMMARY

An intent communication system according to one, non-limiting, embodiment of the present disclosure includes one or more sensors, a controller-circuit, and a broadcast device. The one or more sensors include one or more of a Light Detection and Ranging (LiDAR), a radar, and a computer vision system. The controller-circuit is disposed in a host vehicle, and is configured to determine, based on one or more signals from the one or more sensors, an impending vehicle maneuver. The broadcast device is located in the host vehicle, and is configured to broadcast a broadcast signal containing information directed to the impending vehicle maneuver to at least one vehicle determined to be in a vicinity of the impending vehicle maneuver.

A system according to another, non-limiting, embodiment includes a signal receiver, one or more sensors, a controller-circuit, and a device all located within a receiving vehicle. The signal receiver is configured to receive a broadcast signal from a broadcasting vehicle that contains information directed to an impending vehicle maneuver of the broadcasting vehicle. The one or more sensors include one or more of a LIDAR, a radar, and a computer-vision system. The controller-circuit is configured to determine, based on one or more signals from the one or more sensors and the received broadcast signal, a reactive vehicle maneuver, and output a command signal indicative of the reactive vehicle maneuver. The device is configured to receive the command signal and thereby perform the reactive vehicle maneuver.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The intent communication system 20 processes an imminent, or impending, vehicle maneuver of the host vehicle 22, determines if the receiving vehicle 24 is within a prescribed vicinity, and if so, broadcasts the impending vehicle maneuver of the host vehicle 22 to a receiving vehicle 24. The intent communication system 20 further includes a device constructed to provide notification and/or a reaction generally in response to the broadcasting of the impending vehicle maneuver. In one embodiment, both vehicles 22, 24 are functioning autonomous vehicles. In another embodiment, the host vehicle 22 is an autonomous vehicle and the receiving vehicle is a manually driven, vehicle, or an autonomous vehicle being driven in a manual mode by an operator.

Figure 1:
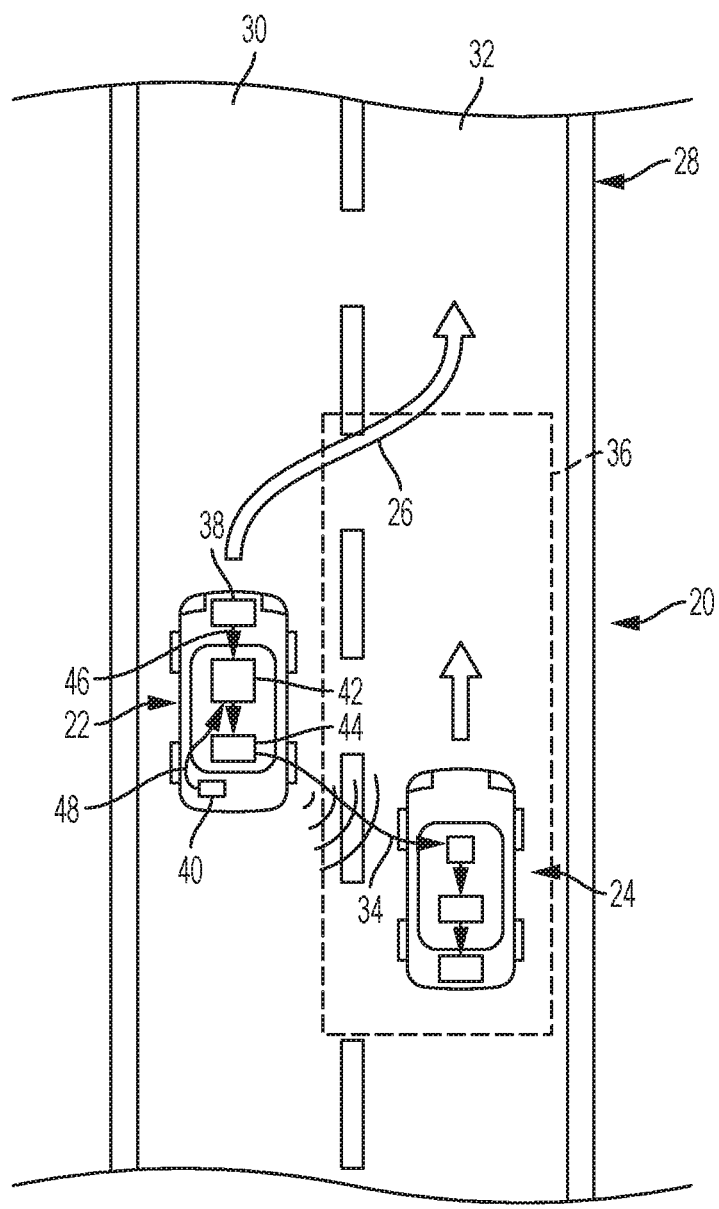
FIG. 1 is a plan view of a roadway with two vehicles applying an intent communication system as one exemplary embodiment of the present disclosure.
Figure 2:
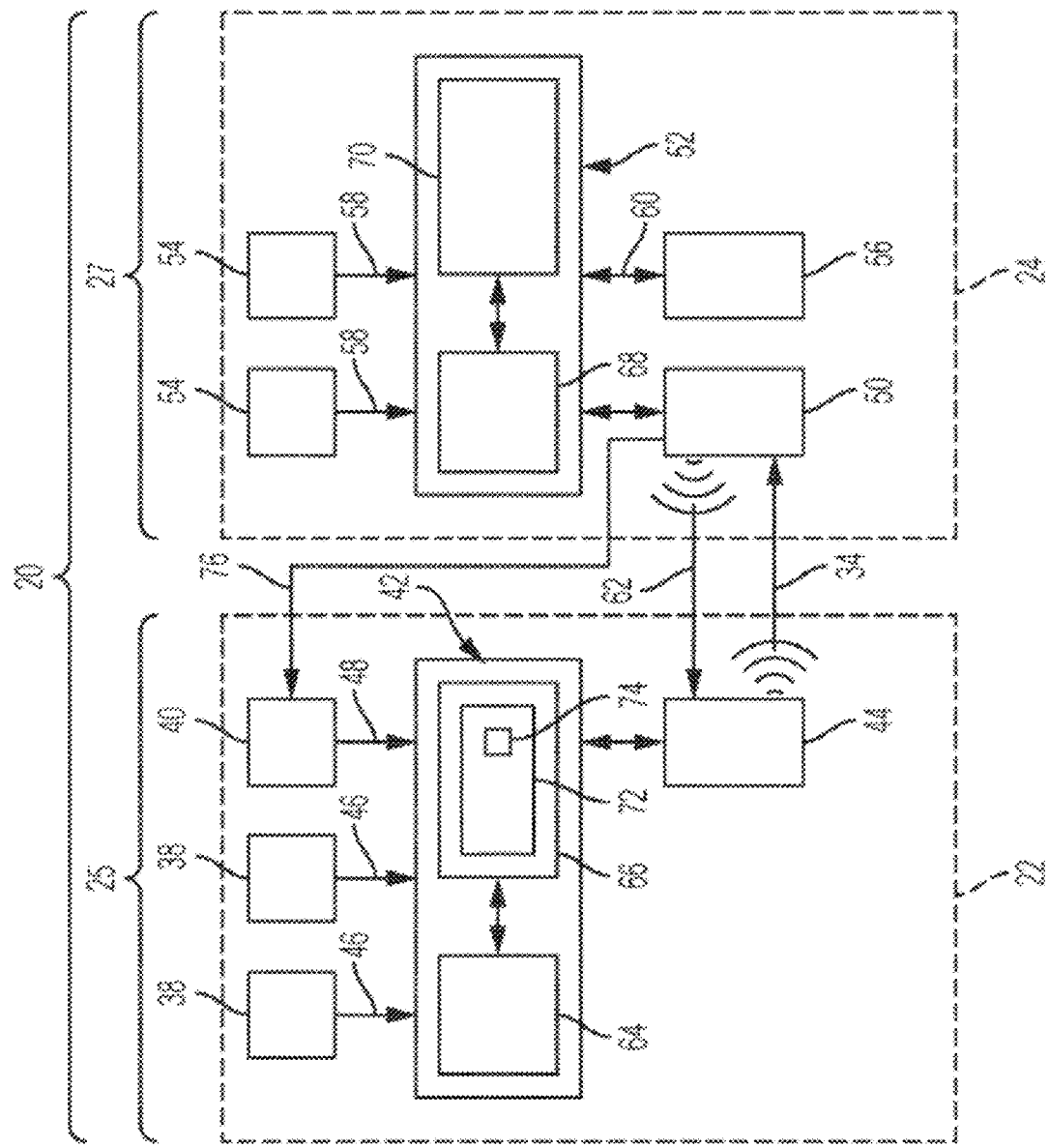
FIG. 2 is a schematic of the intent communication system.

Referring to FIGS. 1 and 2, and in one embodiment, the intent communication system 20 includes a broadcasting component 25 (see FIG. 2) associated with the host vehicle 22, and a receiving component 27 associated with the receiving vehicle 24. More specifically, the broadcasting component 25 includes of one or more sensors, controllers or processors, software-based applications, and other hardware being part of the host vehicle 22. Similarly, the receiving component 27 includes any one or more of sensors, controllers or processors, software-based applications, and other hardware being part of the receiving vehicle 24. In another embodiment, the intent communication system 20 only includes the broadcasting component 25, and the receiving component 27 is merely pre-existing component(s) of the receiving vehicle 24 originally intended to also serve other functions of the receiving vehicle 24 independent of the intent communication system 20. In yet another embodiment, portions of the broadcasting component 25 are part of a cloud-based server. For example, portions of the software-based applications are stored and executed by the cloud-based server with bi-directional communications conducted between the cloud-based server and the host vehicle 22.

Referring to FIG. 1, one, non-limiting, operating scenario of the intent communication system 20 is illustrated, wherein the impending vehicle maneuver (see arrow 26) is a lane change. More specifically, the host vehicle 22 intends to change lanes on a roadway 28 from a left lane 30 to a right lane 32. The broadcasting component 25 of the intent communication system 20 determines the impending vehicle maneuver 26, then broadcasts the maneuver as a broadcast signal (see arrow 34) to the receiving component 27 in the receiving vehicle 24 that is within a prescribed vicinity 36 associated with the maneuver 26. In one embodiment, when the broadcast signal 34 is received by the receiving component 27, the receiving component 27 notifies a human operator of the receiving vehicle 24 who can then respond accordingly. In another embodiment, the receiving component 27 causes the receiving vehicle 24 to automatically react to the broadcast signal 34, such as slowing down to assist in the lane change maneuver.

It is contemplated that other impending vehicle maneuver examples include braking, accelerating, parking, turning left or right at an intersection, and a host of other maneuvers. For example, the impending vehicle maneuver is a braking action, and the broadcasting component 25 broadcasts this impending action to a receiving vehicle 24 located closely behind the host vehicle 22. In another example, the impending vehicle maneuver may be an acceleration, and the broadcasting component 25 broadcasts this impending action to a receiving vehicle 24 that is merging onto the same lane traveled by the host vehicle 22. In another example, the impending vehicle maneuver may be turning right within an intersection, and the broadcasting component 25 broadcasts this impending action to a receiving vehicle 24 that is determined to represent on-coming traffic.

Referring to FIGS. 1 and 2, and in one embodiment, the broadcasting component 25 of the intent communication system 20 (i.e., in the host vehicle 22) includes at least one sensor 38, an object detection system 40 (i.e., sensor), a controller-circuit 42, and a broadcast device 44. The sensors 38 are configured to output respective signals (see arrows 46) to the controller-circuit 42. The controller-circuit 42 is then configured to determine the impending vehicle maneuver 26, based at least in-part, on the signals 46. In one embodiment, while the controller-circuit 42 of the broadcasting component 25 determines the impending vehicle maneuver 26, the object detection system 40 detects the at least one vehicle 24 and outputs a detected signal (see arrow 48) to the controller-circuit 42. As examples of the object detection system 40, the detection of the receiving vehicle 24, and potentially other local vehicles that may or may not be receiving vehicles, is performed by one or more of the detection of a broadcast signal from at least one vehicle, from a computer-vision sensor, from known positions of vehicles transmitted from a cloud-based server (see FIG. 3), and as a relayed signal through surrounding infrastructure (see FIG. 4).

In another embodiment, the controller-circuit 42 may first determine the impending vehicle maneuver 26, and based on the determination, the object detection system 40 may then detect the at least one vehicle 24 and outputs a detected signal 48 to the controller-circuit 42. It is contemplated that in one embodiment, the object detection system 40 is an integral part of the at least one sensor 38, or the sensor 38, for example, is an integral part of the object detection system 40.

The sensors 38 (i.e., detector systems) of the broadcasting component 25 are used to detect surrounding conditions such as roadways, roadway conditions, intersections, moving and stationary objects, and other vehicles in order to maneuver the host vehicle 22. In one example, other sensors include those necessary to controllably operate the controller-circuit 42. Alternatively, such sensors used to control the controller-circuit 42 are an integral part of the controller-circuit 42. In one embodiment, the sensors 38, or portions thereof, are strategically located on, or within, the host vehicle 22. In one embodiment, the sensors 38 are configured to output an array of signals 46 to the controller-circuit 42 for processing, and vehicle guidance and/or control. Non-limiting examples of the sensors 38 include one or more of a Light Detection and Ranging (LiDAR), radar, and computer-vision systems.

In one embodiment, the intent communication system 20 further includes the receiving component 27 located in the receiving vehicle 24. The receiving component 27 includes a receiver 50 configured to receive the broadcast signal 34, a controller-circuit 52, one or more sensors 54, and at least one device 56. In the example where the receiving vehicle 24 is an autonomous vehicle, the one or more sensors 54 are adapted to output signals (see arrows 58) to the controller-circuit 42. The controller-circuit 42 processes the signals 58 and outputs associated command signal(s) 60 to the at least one device 56 to effect vehicle maneuvers (i.e., reactive vehicle maneuvers) of the vehicle 24. Non-limiting examples of the sensors 54 include one or more of a LiDAR, radar, and computer-vision systems. Non-limiting examples of the devices 56 include one or more of a steering actuator, a brake actuator, and an accelerator actuator, and other devices or actuators adapted to control and/or effect maneuvers of the receiving vehicle 24.

In one embodiment, the receiver 50 receives the broadcast signal 34 from the host vehicle 22. The controller-circuit 52 then processes the information contained within the broadcast signal 34 and applies this information along with the signals 58 from the sensors 54 to determine the subsequent vehicle maneuver of the receiving vehicle 24. Depending upon the signals 58, the receiving vehicle 24 may, or may not, be in a position to assist the host vehicle 22 in making the impending vehicle maneuver 26. For example, and utilizing the scenario presented in FIG. 1, after receiving component 27 in the receiving vehicle 24 receives the broadcast signal 34 (e.g., containing information of an impending lane change), the controller-circuit 52 receives and processes the signals 58 to determine if, and how, to assist in the impending lane change of the host vehicle 22. In one scenario, the controller-circuit, based on the signals 58, may determine a deceleration will assist the host vehicle 22. In this case, the controller-circuit 52 outputs a brake, or deceleration command signal 60 to the device 56 (e.g., brake device). In another case, the controller-circuit, based on the signals 58, may determine that the receiving vehicle 24 is not in a position to assist the host vehicle 22 in the lane change maneuver.

As a continuation of the lane change scenario, the receiver 50 of the receiving component 27 in the receiving vehicle 24 and the broadcast device 44 of the broadcasting component 25 are both transceivers capable of bi-directional communication. In this embodiment, the controller-circuit 52 is configured to output a response signal (see arrow 62) via the transceiver 50. The response signal 62 contains information on how the receiving vehicle 24 intends to assist the host vehicle 22 in making the impending vehicle maneuver 26, and/or may simply deny any assistance based on sensor signals 58 and/or an inability to assist.

In another embodiment, the receiving vehicle 24 is a manually driven vehicle, or an autonomous vehicle being driven in an automated mode. In this example, the device 56 of the receiving component 27 is a notification device such as a display screen (e.g., an interactive screen), or an audible device, to convey the impending vehicle maneuver information to a human operator of the receiving vehicle 24. Upon the conveyance of the impending vehicle maneuver 26 to the human operator of the receiving vehicle, the human operator has the ability to respond (i.e., the response signal 62) to the broadcasting component 25, or otherwise to the host vehicle 22. In this example, the device 56 further includes any one or more of a microphone, a speaker, a human-computer interactive device, and other devices.

In some embodiments, the controller-circuit 42 of the broadcasting component 25 in the host vehicle 22 includes one or more processors 64 (i.e., one illustrated in FIG. 2) and one or more electronic storage mediums 66 (i.e., one illustrated in FIG. 2). Similarly, the controller-circuit 52 includes one or more processors 68 (i.e., one illustrated in FIG. 2) and one or more electronic storage mediums 70 (i.e., one illustrated in FIG. 2). The processors 64, 68 may be a microprocessor or other control circuitry such as analog and/or digital control circuitry including an application specific integrated circuit (ASIC) for processing data as is known by one with skill in the art. The storage mediums 66, 70 of the respective controller-circuits 42, 52 may be non-volatile memory, such as electrically erasable programmable read-only memory (EEPROM) for storing one or more routines, thresholds, and captured data, hereafter referred to as application(s). The applications may be executed by one or more of the processors 64, 68 to enable operation, or functioning, of the intent communication system 20.

In one embodiment, the controller-circuit 42 of the broadcasting component 25 is configured to determine whether or not the detected vehicle 24 is within a prescribed (i.e., preprogrammed) vicinity 36 (see FIG. 1). If the detected vehicle 24 is within the prescribed vicinity 36, the controller-circuit 42 of the broadcasting component 25 then initiates the broadcasting of the signal 34, which contains information relative to the impending vehicle maneuver 26, to the receiving component 27 in the receiving vehicle 24. In one embodiment, the preprogrammed vicinity 36 may be one of a plurality of preprogrammed vicinities, with each vicinity associated with a respective one of a plurality of preprogrammed impending vehicle maneuvers (i.e., maneuver types).

More specifically, and in one embodiment, the broadcasting component 25 of the intent communication system 20 includes, or is, a software-based application 72 that includes computer instructions enabling operations as previously described, and preprogrammed data 74. The preprogrammed data 74 includes the plurality of preprogrammed vicinities 36. The application 72 chooses a particular vicinity 36 based on at least one condition or factor (e.g., impending vehicle maneuver type). More specifically, the types of impending vehicle maneuvers 26 are preprogrammed as part of the data 74, and depending upon the type of impending vehicle maneuver, a particular preprogrammed vicinity 36 is chosen by the application 72.

In other embodiments, other conditions, or factors, can also impact selection of a preprogrammed vicinity 36. For example, the type of vehicle maneuver may be a lane change, however, multiple vicinities are selectable, or calculable, based on the speed of the host vehicle 22 detected by one of the sensors 38. In one embodiment, each vicinity 36 includes a prescribed shape, a prescribed area, and a prescribed orientation and distance from the host vehicle 22.

In another embodiment, the object detection system 40 of the broadcasting component 25 is configured to detect a broadcast signal 76 (e.g., beacon signal) sent from the receiving vehicle 24 via the transceiver 50. The signal 76 is received by the broadcast device 44, and is recognized by the controller-circuit 42 in the host vehicle 22. In this example, the object detection system 40 is at least in-part software-based and part of the application 72. It is further contemplated that the object detection system 40 may include a dedicated receiver configured to receive the broadcast signal 76 and output the information relative to the broadcast signal 76 to the controller-circuit 42.

Figure 3:
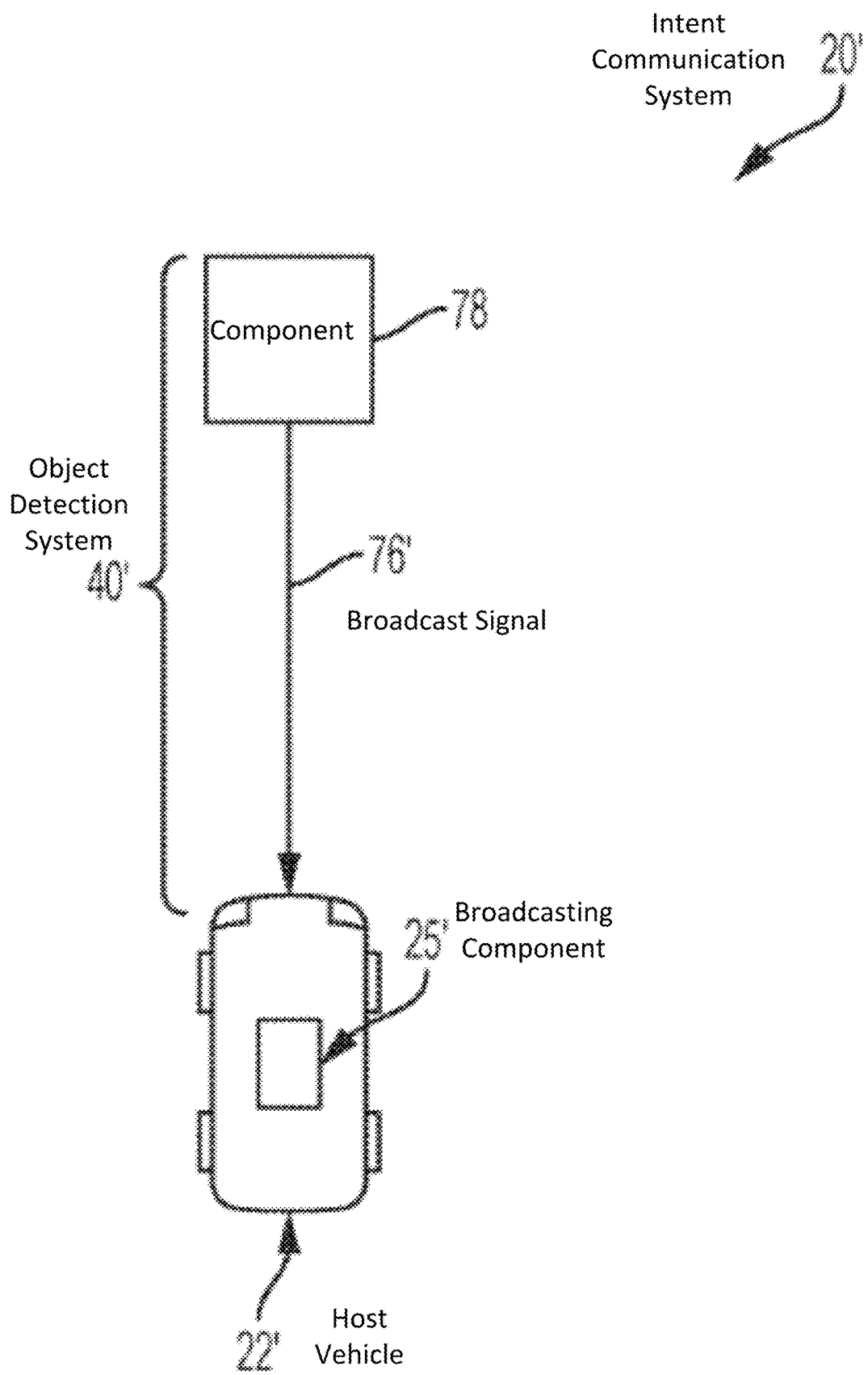
FIG. 3 is a schematic of a second embodiment of an intent communication system.

Referring to FIG. 3, a second embodiment of the intent communication system is illustrated wherein like elements to the first embodiment have like identifying numerals except with the addition of a prime suffix. An intent communication system 20' includes an object detection system 40' that utilizes a component 78 which is remote from both vehicles 22', 24'. Non-limiting examples of the component 78 include a cloud-based server, infrastructure adapted to relay signals 76', and others. In one example, the cloud-based server may be aware of known positions of vehicles and may initiate the broadcast signal 76' to a broad casting component 25' in the host vehicle 22'. In one example, the vehicles report their positions to the cloud-based server 78. In another example, the infrastructure tracks the vehicles and reports the respective locations to the cloud-based server.

Figure 4:
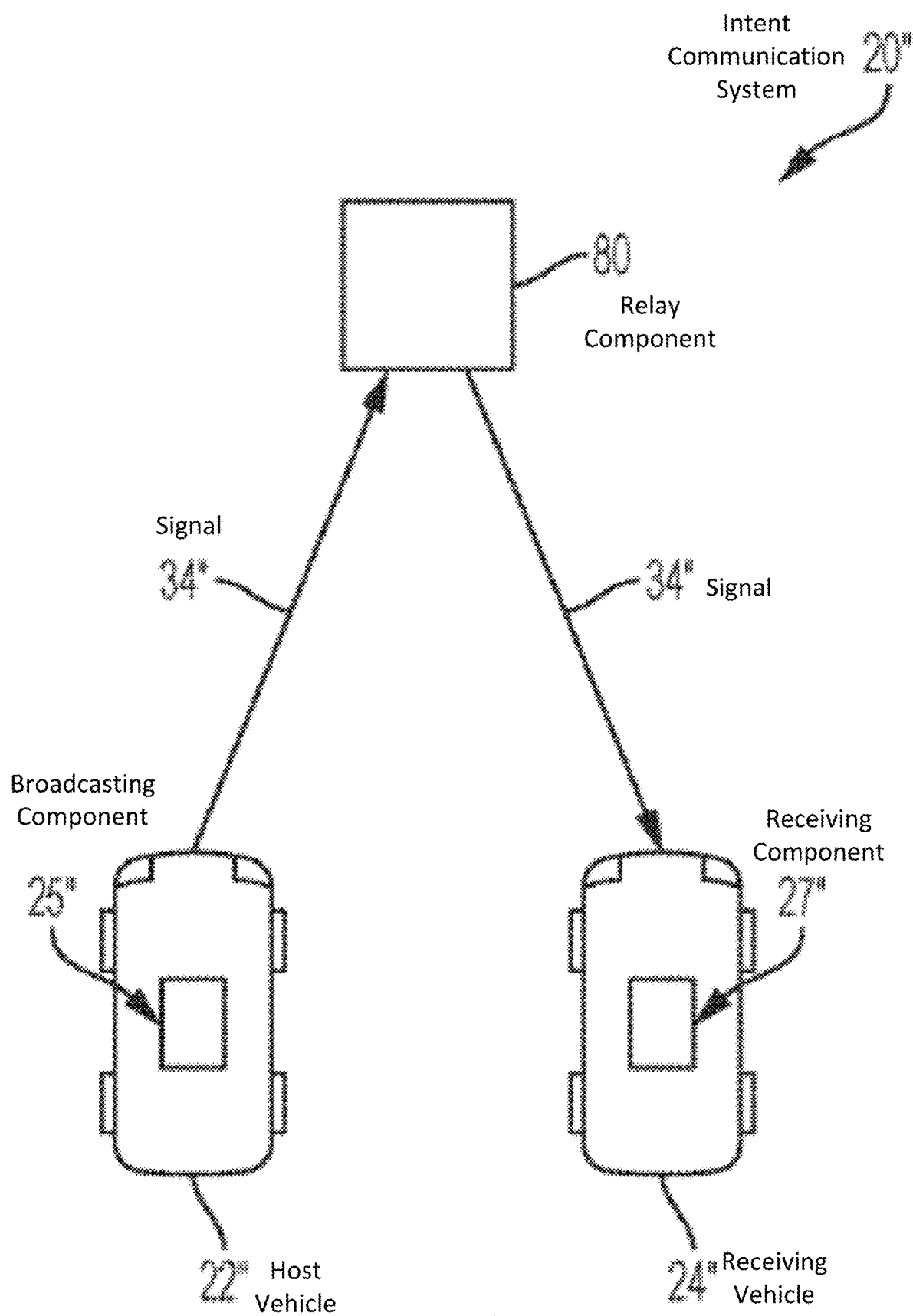
FIG. 4 is a schematic of a fourth embodiment of an intent communication system.

Referring to FIG. 4, a third embodiment of the intent communication system is illustrated wherein like elements to the first embodiment have like identifying numerals except with the addition of a double prime suffix. A broadcasting component 25" of an intent communication system 20" is adapted to broadcast a broadcast signal 34" to a relay component 80 configured to relay the signal 34" from a host vehicle 22" and to a receiving component 27" in a receiving vehicle 24". In one example, the relay component 80 is an intermediate vehicle. In another example, the relay component 80 is an infrastructure.

Benefits and advantages of the present disclosure include the ability of an autonomous vehicle instructing another, receiving, vehicle to yield to the autonomous vehicle whether or whether not the receiving vehicle is a human operated vehicle or an autonomous vehicle. Other advantages include the ability to force a human driven vehicle to, for example, brake in order to make way for an autonomous vehicle (e.g., a lane change). In further embodiments, advantages include the ability of a human operator of the receiving vehicle to communicate with the autonomous vehicle to convey intent.

The various functions described above may be implemented or supported by a computer program that is formed from computer readable program codes, and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other non-transitory forms.

The terminology used in the description of the various described embodiments herein is for the purpose of describing particular embodiments only and is not intended to be limiting. As used in the description of the various described embodiments and the appended claims, the singular forms "a", n and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "it" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms used herein such as component, application, module, system, and the like are intended to refer to a computer-related entity, either hardware, a combination of hardware and software, or software execution. By way of example, an application may be, but is not limited to, a process running on a processor, a processor, an object, an executable, a thread of execution, a program, and/or a computer. An application running on a server and the server, may be a component. One or more applications may reside within a process and/or thread of execution and an application may be localized on one computer and/or distributed between two or more computers.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An intent communication system comprising:
one or more sensors, the one or more sensors comprising one or more of a Light Detection and Ranging (LiDAR), a radar, and a computer vision system;
a controller-circuit disposed in a host vehicle, the controller-circuit configured to:
  determine, based on one or more signals from the one or more sensors, an impending vehicle maneuver;
  determine, based on the impending vehicle maneuver, a maneuver type of a plurality of maneuver types;
  determine, based on the maneuver type, a prescribed vicinity; and
  determine, based on the prescribed vicinity, a vehicle that is within the prescribed vicinity; and
a broadcast device located in the host vehicle, and configured to:
  broadcast a broadcast signal containing information directed to the impending vehicle maneuver to the vehicle that was determined to be within the prescribed vicinity of the impending vehicle maneuver; and
  receive information from the vehicle on how the vehicle intends to assist the host vehicle in making the impending vehicle maneuver.

2. The system set forth in claim 1, further comprising:
an object detection system configured to detect the vehicle within the prescribed vicinity and output a detection signal to the controller-circuit.

3. The system set forth in claim 1, wherein the controller-circuit includes a processor configured to determine if the vehicle is located within the prescribed vicinity of the impending vehicle maneuver.

4. The system set forth in claim 1, wherein the prescribed vicinity is based at least in-part on a speed of the host vehicle measured by the one or more sensors.

5. The system set forth in claim 1, further comprising:
an object detection system configured to detect and recognize the vehicle within the prescribed vicinity.

6. The system set forth in claim 5, wherein the object detection system includes one or more of a Light Detection and Ranging (LiDAR), a radar, and a computer vision system.

7. The system set forth in claim 1, wherein the detection of the vehicle within the prescribed vicinity is further based on one or more of detection of a broadcast signal from the vehicle within the prescribed vicinity, from a computer-vision sensor, from known positions of vehicles transmitted from a cloud-based server, and as a relayed signal through surrounding infrastructure.

8. The system set forth in claim 1, wherein determination of the prescribed vicinity includes determination of a prescribed shape, prescribed area, prescribed orientation, or prescribed distance from the host vehicle.

9. A system comprising:
a signal receiver disposed in a receiving vehicle and configured to receive a broadcast signal from a broadcasting vehicle and containing information directed to an impending vehicle maneuver of the broadcasting vehicle, wherein the signal is based on an identification, by the broadcasting vehicle based at least in part on the speed of the broadcasting vehicle, that the receiving vehicle is within a prescribed vicinity of the impending vehicle maneuver of the broadcasting vehicle;
one or more sensors in the receiving vehicle, the one or more sensors comprising one or more of a LIDAR, a radar, and a computer-vision system;
a controller-circuit disposed in the receiving vehicle, the controller-circuit configured to determine, based on one or more signals from the one or more sensors and the received broadcast signal, a reactive vehicle maneuver and output a command signal indicative of the reactive vehicle maneuver; and
a device in the receiving vehicle configured to receive the command signal and thereby react to the impending vehicle maneuver, and to send information to the broadcasting vehicle on how the receiving vehicle intends to react to the impending vehicle maneuver.

10. The system set forth in claim 9, further comprising:
a relay component is configured to relay the broadcast signal from the broadcasting vehicle and to the receiving vehicle.

11. The system set forth in claim 10, wherein the relay component is an intermediate vehicle.

12. The system set forth in claim 10, wherein the relay component is an infrastructure.

13. The system set forth in claim 9, wherein the device includes at least one of a brake actuator, a steering actuator, and an accelerator actuator.

14. The system set forth in claim 9, wherein the device includes at least one of a display device and an audible device configured to notify an occupant in the receiving vehicle of the impending vehicle maneuver.

15. The system set forth in claim 9, further comprising:
an object detection system disposed in the broadcasting vehicle, and configured to detect and recognize the receiving vehicle.

16. The system set forth in claim 9, further comprising:
one or more sensors disposed in the broadcasting vehicle, the one or more sensors including one or more of a Light Detection and Ranging (LiDAR), a radar, and a computer vision system; and
a controller-circuit disposed in the broadcasting vehicle, the controller-circuit configured to determine, based on one or more signals from the one or more sensors in the broadcasting vehicle, the impending vehicle maneuver.

17. The system set forth in claim 9, further comprising:
a broadcast device disposed in the broadcasting vehicle, and configured to broadcast the broadcast signal.

18. The system set forth in claim 16, wherein the controller-circuit includes a processor configured to receive a detected signal from an object detection system, and based at least in-part of the detected signal determine if the receiving vehicle is located within the prescribed vicinity of the impending vehicle maneuver.

19. The system set forth in claim 18, wherein the prescribed vicinity is one of a plurality of prescribed vicinities respectively associated with a plurality of prescribed vehicle maneuver types associated with the impending vehicle maneuver.

20. The system set forth in claim 19, wherein respective ones of the plurality of prescribed vicinities have a different prescribed shape, prescribed area, prescribed orientation, or prescribed distance from the broadcasting vehicle.

\* \* \* \* \*